United States Patent
Xiao et al.

(10) Patent No.: US 12,438,471 B2
(45) Date of Patent: Oct. 7, 2025

(54) CIRCUIT AND METHOD FOR CONTROLLING RECTIFIER, AND CIRCUIT INCLUDING THE RECTIFIER

(71) Applicant: Telefonaktiebolaget LM Ericsson (publ), Stockholm (SE)

(72) Inventors: Huajuan Xiao, Beijing (CN); Donghao Li, Beijing (CN); Ying Cao, Beijing (CN); Jiashen Tian, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 249 days.

(21) Appl. No.: 18/035,315

(22) PCT Filed: Nov. 6, 2020

(86) PCT No.: PCT/CN2020/127122
§ 371 (c)(1),
(2) Date: May 4, 2023

(87) PCT Pub. No.: WO2022/094928
PCT Pub. Date: May 12, 2022

(65) Prior Publication Data
US 2023/0402932 A1    Dec. 14, 2023

(51) Int. Cl.
*H02M 3/335* (2006.01)
*H02M 1/00* (2006.01)
*H02M 3/00* (2006.01)

(52) U.S. Cl.
CPC ..... *H02M 3/33592* (2013.01); *H02M 1/0022* (2021.05); *H02M 1/0025* (2021.05); *H02M 3/01* (2021.05)

(58) Field of Classification Search
CPC ................................................. H02M 3/33592
See application file for complete search history.

(56) References Cited

U.S. PATENT DOCUMENTS 7,330,365 B2    2/2008 Usui et al.
2012/0063175 A1*    3/2012 Wang ................ H02M 3/33592
                                                    363/21.14
(Continued)

FOREIGN PATENT DOCUMENTS

CN    105932881 A    9/2016
CN    207926445 U    9/2018
(Continued)

OTHER PUBLICATIONS

Machien translation of JP 2014236596 provided on applicant's IDS. (Year: 2014).*

*Primary Examiner* — Peter M Novak
(74) *Attorney, Agent, or Firm* — Murphy, Bilak & Homiller, PLLC

(57) ABSTRACT

A circuit and a method for controlling a rectifier, and a circuit including the rectifier are disclosed. The rectifier may comprise: a transformer (T); an inductor (Lm) coupled with a primary winding (Np) of the transformer (T) in parallel; at least one switching component (SR1, SR2) coupled between a secondary winding (Ns1, Ns2) of the transformer (T) and an output of the rectifier. The method may comprise: sensing (S101) a current flowing into a combination of the inductor (Lm) and the primary winding (Np) of the transformer (T); generating (S102) an indication voltage, based on the sensed current; comparing (S103) the indication voltage and a reference voltage; and driving (S104) the at least one switching component (SR1, SR2), based on a comparison result of the indication voltage and the reference voltage. The timing point for turning on/off the switching component (SR1, SR2) may be optimized, so as to reduce the power loss and improve the efficiency.

11 Claims, 16 Drawing Sheets

(56) References Cited

U.S. PATENT DOCUMENTS

2015/0349627 A1* 12/2015 Lin .................. H02M 3/01
363/21.02
2017/0085188 A1   3/2017 Foresta et al.

FOREIGN PATENT DOCUMENTS

| | | |
|---|---|---|
| CN | 108988648 A | 12/2018 |
| CN | 109768711 A | 5/2019 |
| CN | 111865090 A | 10/2020 |
| JP | 2014236596 A | 12/2014 |
| JP | 6576737 B2 | 8/2019 |
| KR | 20170035583 A | 3/2017 |

* cited by examiner

Driving the at least one switching component, based on a driving signal of the primary side bridge circuit, and the comparison result of the indication voltage and the reference voltage. — S1041

FIG. 4B

Driving the first switching component, based on a driving signal of the third switching component, and the comparison result of the indication voltage and the reference voltage — S10411

Driving the second switching component, based on a driving signal of the fourth switching component, and the comparison result of the indication voltage and the reference voltage — S10412

FIG. 4C

CIRCUIT AND METHOD FOR CONTROLLING RECTIFIER, AND CIRCUIT INCLUDING THE RECTIFIER

TECHNICAL FIELD

The present disclosure relates generally to the electric technology, and in particular, to a circuit and a method for controlling a rectifier, and a circuit including the rectifier.

BACKGROUND

This section introduces aspects that may facilitate better understanding of the present disclosure. Accordingly, the statements of this section are to be read in this light and are not to be understood as admissions about what is in the prior art or what is not in the prior art.

In electric circuits, a rectifier, which usually comprises at least one switching component, is a widely used component. By periodically turning on/off the at least one switching component, the rectifier may change a voltage, such as an AC (alternative current) voltage, to another voltage, such as a DC (direct current) voltage.

It is desired to control the turning on/off of the at least one switching component more accurately, so as to reduce power loss and improve rectification efficiency.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

Some embodiments herein address one or more problems with a conventional solution that senses a voltage across an input terminal and an output terminal of a switching component, to determine when to turn off the switching component. Some embodiments for example address a problem that a stray inductor of the switching component may cause voltage measurement biases, such that a current through the switching component might still exist when the switching component is turned off, and thus the current will flow through a body diode of the switching component. That current will cause bigger loss and lower efficiency.

Some embodiments in this regard provide an improved circuit and method for controlling a rectifier, and circuit including the rectifier. Particularly, the timing point for turning on/off the switching component may be optimized, such that the current flowing through switching component may be with reduced value when the switching component is to be turned off. Therefore, the power loss may be reduced and the efficiency may be improved.

A first aspect of the present disclosure provides a method for controlling a rectifier, wherein the rectifier comprises: a transformer; an inductor coupled with a primary winding of the transformer in parallel; at least one switching component coupled between a secondary winding of the transformer and an output of the rectifier. The method comprises: sensing a current flowing into a combination of the inductor and the primary winding of the transformer; generating an indication voltage, based on the sensed current; comparing the indication voltage and a reference voltage; and driving the at least one switching component, based on a comparison result of the indication voltage and the reference voltage.

In exemplary embodiments of the present disclosure, the method further comprises: generating the reference voltage, based at least on an input voltage of the rectifier.

In exemplary embodiments of the present disclosure, the input voltage is a direct current (DC) voltage; and the input voltage is converted, by a primary side bridge circuit, to an alternative current (AC) voltage. The method further comprises: driving the at least one switching component, based on a driving signal of the primary side bridge circuit, and the comparison result of the indication voltage and the reference voltage.

In exemplary embodiments of the present disclosure, the at least one switching component of the rectifier comprises a first switching component and a second component; the primary side bridge circuit comprises a third switching component, and a fourth switching component. The method further comprises: driving the first switching component, based on a driving signal of the third switching component, and the comparison result of the indication voltage and the reference voltage; and driving the second switching component, based on a driving signal of the fourth switching component, and the comparison result of the indication voltage and the reference voltage.

In exemplary embodiments of the present disclosure, the primary side bridge circuit is a half bridge including a branch with two switching components, or the primary side bridge circuit is a full bridge including two branches each with two switching components.

In exemplary embodiments of the present disclosure, the first switching component is turned on, if the generated indication voltage is greater than the reference voltage and the third switching component is turned on; the first switching component is turned off, if the generated indication voltage is less than the reference voltage or the third switching component is turned off; the second switching component is turned on, if the generated indication voltage is greater than the reference voltage and the fourth switching component is turned on; and the second switching component is turned off, if the generated indication voltage is less than the reference voltage or the fourth switching component is turned off.

In exemplary embodiments of the present disclosure, the sensed current is a resonant current of a resonant circuit; the resonant circuit is coupled between the primary side bridge circuit and the inductor; and the inductor is integrated in the transformer.

In exemplary embodiments of the present disclosure, the reference voltage is generated, based at least on an input voltage of the rectifier, an induction value of the inductor, and a resonant frequency of the resonant circuit.

In exemplary embodiments of the present disclosure, the sensed current is bidirectional alternative current; and the generated indication voltage is a unidirectional alternative voltage.

In exemplary embodiments of the present disclosure, the reference voltage has a first value; the indication voltage becomes to a second value, corresponding to that a current flowing in the secondary winding of the transformer becomes to a minimum value; and the first value of the reference voltage is equal to the second value of the indication voltage, or greater than the second value with an offset.

In exemplary embodiments of the present disclosure, the reference voltage becomes from the first value to a third value, corresponding to that the first switching component or the second switching component is turned off.

In exemplary embodiments of the present disclosure, the reference voltage has a first value; the indication voltage becomes to a second value, corresponding to that a current flowing in the inductor becomes to a peak value; and wherein a first value of the reference voltage is equal to the second value of the indication voltage or greater than the second value with an offset.

A second aspect of the present disclosure provides a circuit for controlling a rectifier, wherein the rectifier comprises: a transformer; an inductor coupled with a primary winding of the transformer in parallel; at least one switching component coupled between a secondary winding of the transformer and an output of the rectifier. The circuit for controlling the rectifier comprises: a sensing unit, configured to sense a current flowing into a combination of the inductor and the primary winding of the transformer; and generate an indication voltage, based on the sensed current; a comparing unit, configured to compare the indication voltage and a reference voltage. The circuit for controlling a rectifier is configured to drive the at least one switching component, based on a comparison result of the indication voltage and the reference voltage.

In exemplary embodiments of the present disclosure, the circuit for controlling the rectifier further comprises: a reference voltage generating unit, configured to generate the reference voltage, based on at least on an input voltage of the rectifier.

In exemplary embodiments of the present disclosure, the reference voltage generating unit comprises: a resistance network, configured to convert the input voltage to the reference voltage; and a first delay capacitor, coupled between an output port of the reference voltage generating unit and a ground, and configured to delay an output of the reference voltage.

In exemplary embodiments of the present disclosure, the reference voltage generating unit further comprises: an output control subunit, configured to control a comparison between the indication voltage and the reference voltage, based on the driving signal of the primary side bridge circuit. The output control subunit comprises: a second delay capacitor, coupled between an input port of the output control subunit and a ground, and configured to delay an input of the driving signal of the primary side bridge circuit.

In exemplary embodiments of the present disclosure, the output control subunit is coupled to an output port of the reference voltage generating unit, and is configured to ground the output port of the reference voltage generating unit if the driving signal of the primary side bridge circuit is inactive.

In exemplary embodiments of the present disclosure, the output control subunit is coupled to an enable port of the comparing unit, and is configured to disable the comparing unit if the driving signal of the primary side bridge circuit is inactive.

In exemplary embodiments of the present disclosure, the input voltage is a direct current (DC) input voltage; the input voltage is converted, by a primary side bridge circuit, to an alternative current (AC) voltage; and the circuit for controlling the rectifier is configured to drive the at least one switching component, based on a driving signal of the primary side bridge circuit, and the comparison result of the indication voltage and the reference voltage.

In exemplary embodiments of the present disclosure, the at least one switching component of the rectifier comprises a first switching component and a second component; the primary side bridge circuit comprise a third switching component, and a fourth switching component. The circuit for controlling the rectifier is further configured to: drive the first switching component, based on a driving signal of the third switching component, and the comparison result of the indication voltage and the reference voltage; and drive the second switching component, based on a driving signal of the fourth switching component and the comparison result of the indication voltage and the reference voltage.

In exemplary embodiments of the present disclosure, the primary side bridge circuit is a half bridge including a branch with two switching components, or the primary side bridge circuit is a full bridge including two branches each with two switching components.

In exemplary embodiments of the present disclosure, the first switching component is turned on, if the generated indication voltage is greater than the reference voltage and the third switching component is turned on; the first switching component is turned off, if the generated indication voltage is less than the reference voltage or the third switching component is turned off; the second switching component is turned on, if the generated indication voltage is greater than the reference voltage and the fourth switching component is turned on; and the second switching component is turned off, if the generated indication voltage is less than the reference voltage or the fourth switching component is turned off.

In exemplary embodiments of the present disclosure, the sensed current is a resonant current of a resonant circuit; the resonant circuit is coupled between the primary side bridge circuit and the inductor; and the inductor is integrated in the transformer.

In exemplary embodiments of the present disclosure, the reference voltage is generated, based at least on an input voltage of the rectifier, an induction value of the inductor, and a resonant frequency of the resonant circuit.

In exemplary embodiments of the present disclosure, the sensed current is bidirectional alternative current; the generated indication voltage is a unidirectional alternative voltage.

In exemplary embodiments of the present disclosure, the reference voltage has a first value; the indication voltage becomes to a second value, corresponding to that a current flowing in the secondary winding of the transformer becomes to a minimum value; and the first value of the reference voltage is equal to the second value of the indication voltage, or greater than the second value with an offset.

In exemplary embodiments of the present disclosure, the reference voltage becomes from the first value to a third value, corresponding to that the first switching component or the second switching component is turned off.

In exemplary embodiments of the present disclosure, the reference voltage has a first value; the indication voltage becomes to a second value, corresponding to that a current flowing in the inductor becomes to a peak value; and a first value of the reference voltage is equal to the second value of the indication voltage or greater than the second value with an offset.

In exemplary embodiments of the present disclosure, the sensing unit comprises: a current transformer, a diode rectifier, and a resistor.

A third aspect of the present disclosure provides a circuit including a rectifier, wherein the rectifier comprises: a transformer; an inductor coupled with a primary winding of the transformer in parallel; at least one switching component coupled between a secondary winding of the transformer and an output of the rectifier. The circuit including the rectifier further comprises the circuit for controlling the rectifier according to any of above-mentioned embodiments.

In exemplary embodiments of the present disclosure, the circuit including the rectifier is a resonant converter.

Embodiments herein afford many advantages. For example, improved circuit and method for controlling a rectifier, and circuit including the rectifier are provided. Particularly, a current flowing into a combination of the inductor and the primary winding of the transformer of the rectifier is selected for controlling the at least one switching component of the rectifier. The timing point for turning on/off the switching component may be optimized, such that the current flowing through the switching component may have a reduced value when the switching component is to be turned off. Therefore, the power loss may be reduced and the efficiency may be improved. A person skilled in the art will recognize additional features and advantages upon reading the following detailed description.

BRIEF DESCRIPTION OF DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

FIG. 4B is a flow chart showing an additional step of method for controlling a rectifier according to embodiments of the present disclosure.

FIG. 4C is a flow chart showing other additional steps of the method for controlling a rectifier according to embodiments of the present disclosure.

DETAILED DESCRIPTION

Figure 1:
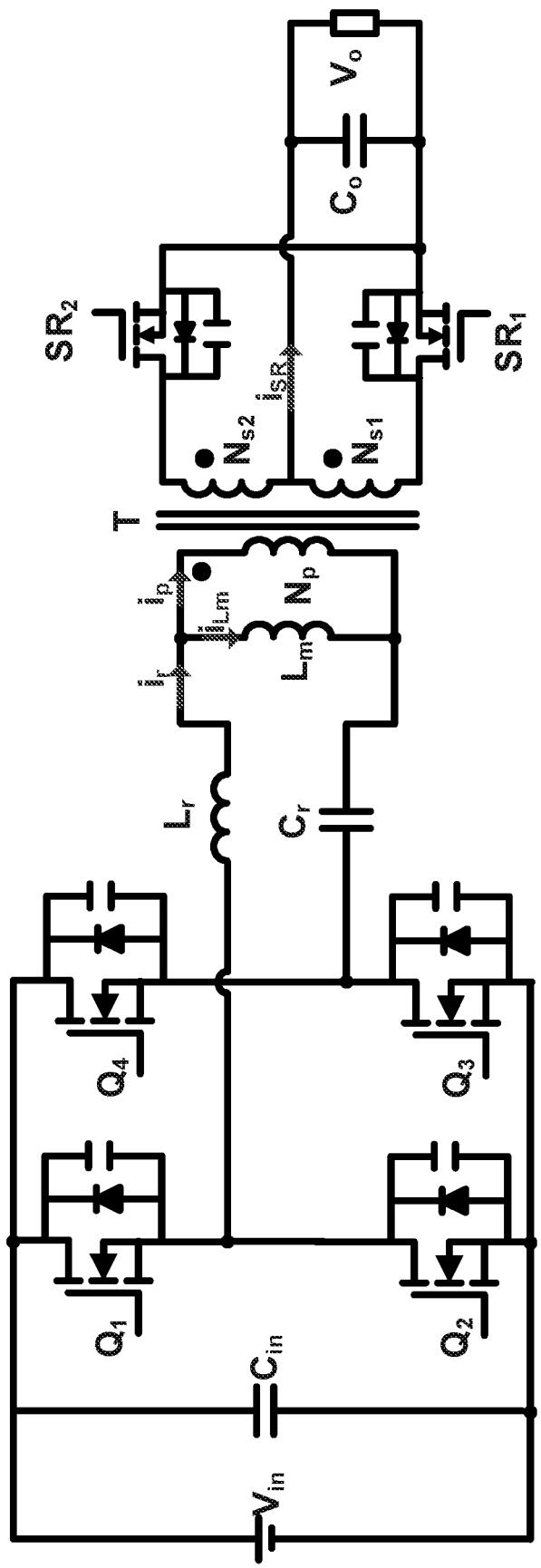
FIG. 1 is an exemplary circuit diagram showing a circuit including a rectifier.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

As used herein, the terms "first", "second" and so forth refer to different elements. The singular forms "a" and "an" are intended to include the plural forms as well, unless the context clearly indicates otherwise. The terms "comprises", "comprising", "has", "having", "includes" and/or "including" as used herein, specify the presence of stated features, elements, and/or components and the like, but do not preclude the presence or addition of one or more other features, elements, components and/or combinations thereof. The term "based on" is to be read as "based at least in part on". The term "one embodiment" and "an embodiment" are to be read as "at least one embodiment". The term "another embodiment" is to be read as "at least one other embodiment". Other definitions, explicit and implicit, may be included below.

The term 'unit' may have conventional meaning in the field of electronics, electrical devices and/or electronic devices and may include, for example, electrical and/or electronic circuitry, modules, processors, components for carrying out respective tasks, procedures, computations, outputs, and/or any other kinds of signal converting/processing, and so on, as such as those described herein.

A rectifier utilized in a resonant converter will be used as an example for illustration. It should be understood the embodiments of the present disclosure may be applied to any rectifier in any other kind of circuit, without limitation.

FIG. 1 is an exemplary circuit diagram showing a circuit including a rectifier.

At present, the resonant converter with synchronous rectifier (SR) is widely used in DC power supply with high efficiency. FIG. 1 is the circuit of one kind of resonant converter, LLC resonant converter, with full-wave rectification.

The rectifier comprises: a transformer T; an inductor $L_m$ coupled with a primary winding $N_p$ of the transformer in parallel; at least one switching component, $SR_1$, $SR_2$ (which in below text will be also referred as SR for simplicity), coupled between at least one corresponding secondary winding ($N_{S1}$, $N_{S2}$), of the transformer and an output of the rectifier.

$V_{in}$ is the input voltage to the resonant converter, and also is considered as the input voltage of the rectifier. $V_{in}$ may be a direct current (DC) voltage; and the input voltage $V_{in}$ is converted, by a primary side bridge circuit ($Q_1$, $Q_2$, $Q_3$, $Q_4$), to an alternative current (AC) voltage, which is inputted to the transformer T. $C_{in}$ is an input capacitor.

A resonant circuit ($L_r$, $C_r$) is coupled between the primary side bridge circuit and the inductor $L_m$. The resonant circuit may comprise a resonant inductor Lr, and a resonant capacitor Cr.

$C_o$ is an output capacitor and the $V_o$ is the output voltage.

Current it is a resonant current flowing into a combination of the inductor and the primary winding of the transformer; $i_p$ is a primary side current of the transformer T, $i_{Lm}$ is the current flowing through the inductor $L_m$, $i_{SR}$ is a secondary side current of the transformer T and also flows through one of the switching components, $SR_1$, $SR_2$.

The resonant converter has three kinds of working modes: switching frequency (fs), such as the switching frequency of the primary side bridge circuit, is equal to resonant frequency (fr) of the resonant circuit ($L_r$, $C_r$), fs is bigger than fr, fs is smaller than fr.

Figure 2:
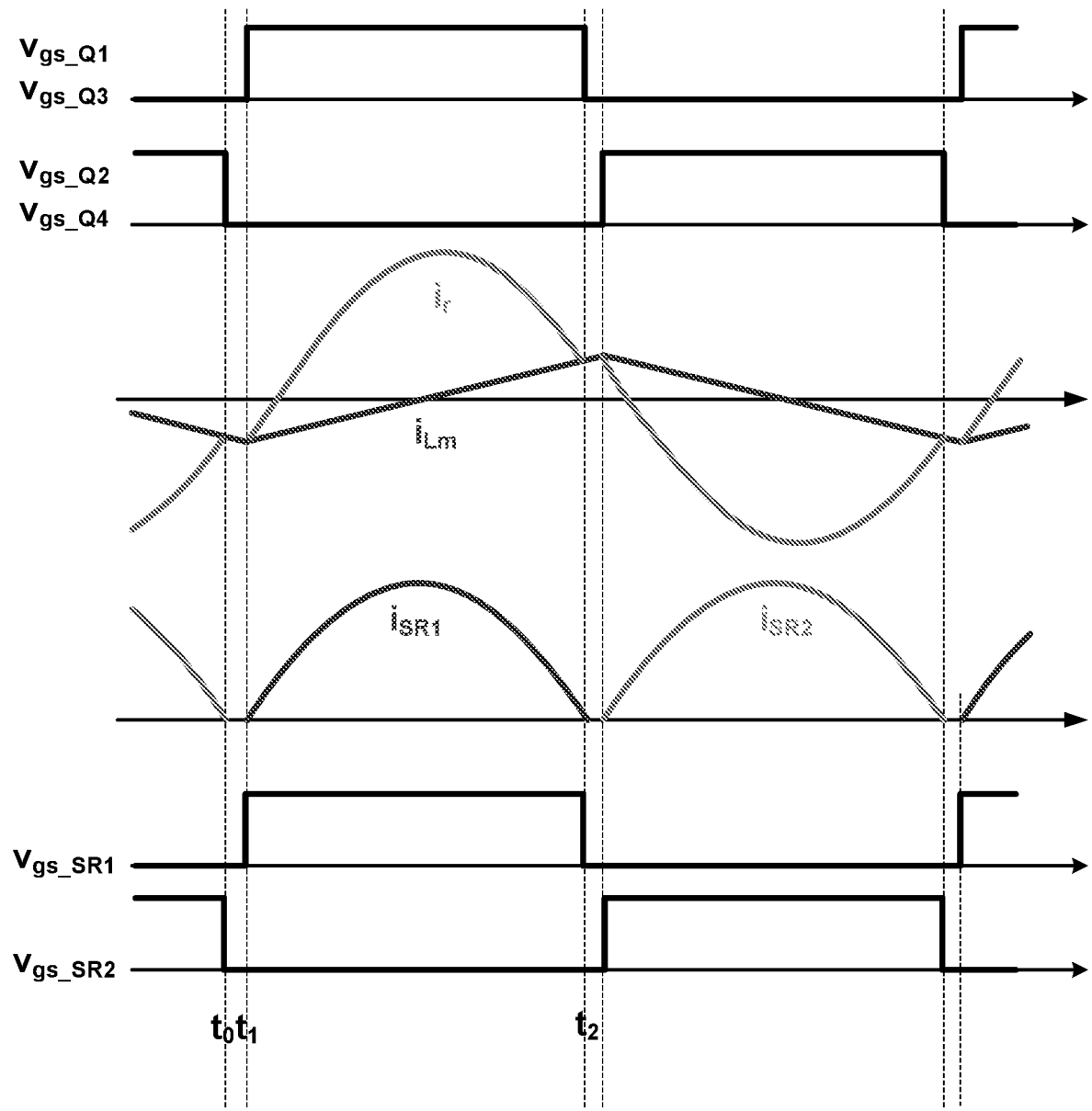
FIG. 2 is a time sequence diagram showing waves of LLC resonant converter working at fs=fr condition.

FIG. 2 is a time sequence diagram showing waves of LLC resonant converter working at fs=fr condition. FIG. 2 shows the ideal waves of LLC resonant converter working at fs=fr condition.

$V_{gs\_Q1}$ is a gate-source voltage of the transistor $Q_1$; $V_{gs\_Q2}$ is a gate-source voltage of the transistor $Q_2$; $V_{gs\_Q3}$ is a gate-source voltage of the transistor $Q_4$; $V_{gs\_Q4}$ is a gate-source voltage of the transistor $Q_4$; $V_{gs\_SR1}$ is a gate-source voltage of the transistor $SR_1$; $V_{gs\_SR2}$ is a gate-source voltage of the transistor $SR_2$.

The time sequence diagram may have following time periods.

Period t0~t1 is dead time, and all switching component, such as Field Effect Transistors (FET), are off. During this period, $i_{Lm}=i_r$, and a capacitor $C_{oss}$ (such as an inner/body capacitor) of Q1 and Q3 are discharged so that zero voltage switching (ZVS) can be achieved.

In period t1~t2, $Q_1$, $Q_3$ and $SR_1$ are turned on, secondary current flows through $SR_1$, shown as $i_{SR1}$, to charge output capacitor Co.

At t2, Q1, Q3 are turned off. $i_{Lm}=i_r$, $i_{SR}=0$, $SR_1$ is turned off. Half duty cycle is over, the other half has the same procedure for another switching component SR2.

To generate accurate driving signals for SR FET (i.e., any of the SR1, SR2), following three methods may be considered: sensing the voltage across the drain to source ($V_{ds}$) of SR FET to generate gate driving signals of SR; sensing the secondary current $i_{SR}$ to generate the gate driving signals; or sensing the primary current of transformer ($i_p$) to generate the gate driving signals.

Such driving manners have some drawbacks.

Figure 3:
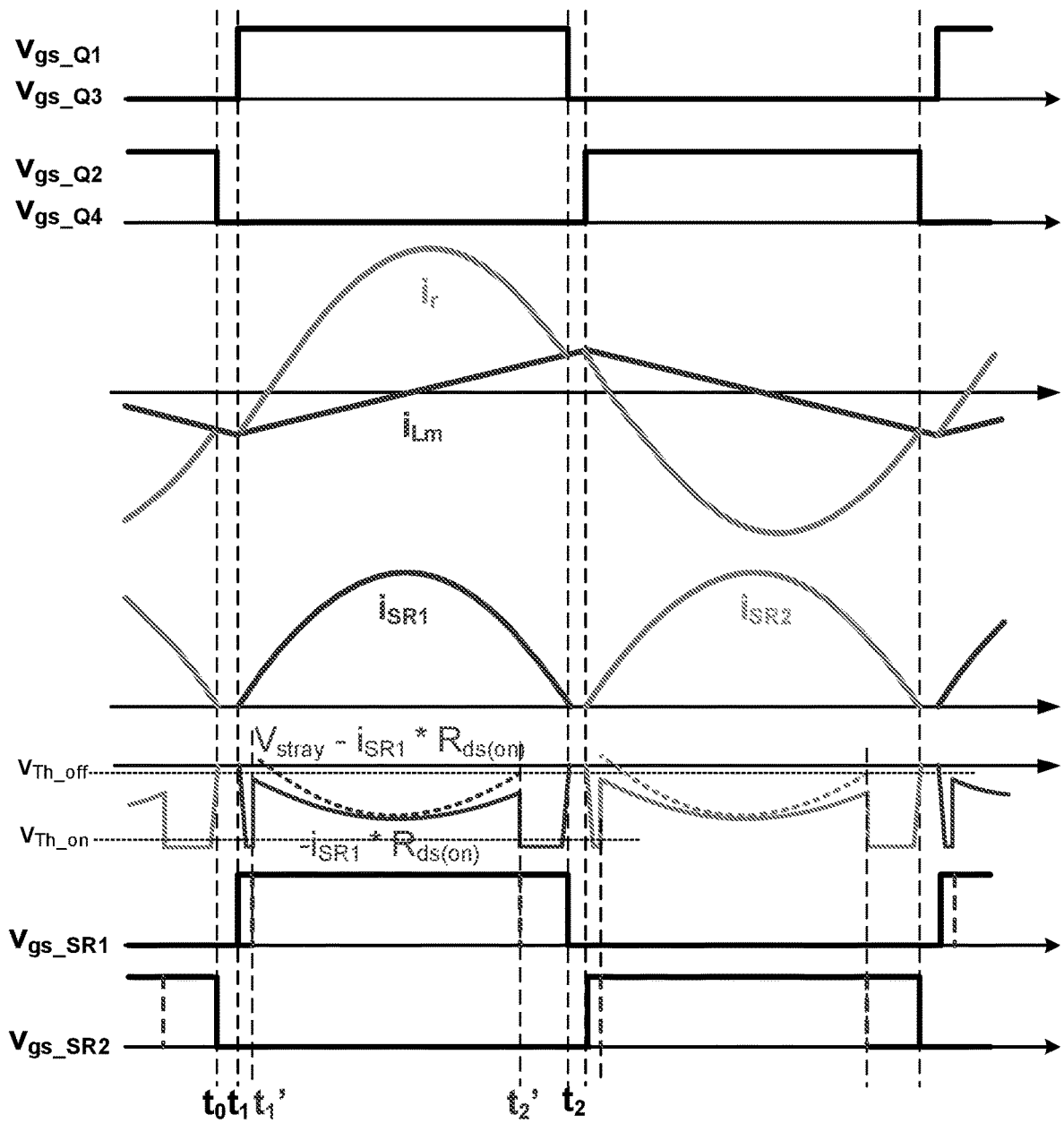
FIG. 3 is a time sequence diagram when getting SR driving signal by sensing $V_{ds}$ of SR.

FIG. 3 is a time sequence diagram when getting SR driving signal by sensing $V_{ds}$ of SR.

As to the widely used synchronous rectification method by sensing Vds of SR FET, the sensed voltage is equal to Rds(on)*(−ISR). Rds (on) is a resistance between the drain electrode and the source electrode when the SR FET is turned on. In the application of resonant converter, the current is nearly sine wave and has big di/dt, which generates a significant voltage drop $V_{stray}$ on the stray inductor $L_{stray}$ (not shown) of SR FET, $V_{stray}=L_{stray}*di/dt$. So, the Vds signal being sensed is $(-R_{ds(on)}*I_{SR}+V_{stray})$ (rather than the desired $-R_{ds(on)}*I_{SR}$), and it is compared with a turn on threshold $V_{TH\_on}$ and a turn off threshold $V_{TH\_off}$. Such manner causes SR FET to be turned off too early. As shown in FIG. 3, SR FET will be turned off at t2' instead of t2 (mainly due to the $V_{stray}$). After SR FET is off, the current still flows through body diode during t2'~t2, which brings bigger loss, lower efficiency and higher thermal stress.

For the method by sensing the current of SR FET ($i_{SR}$) by a current-sense transformer (CT), the main problems are the large size of the CT, since the $i_{SR}$ may be rather big. The extra conduction loss of the winding and the undesired delay will cause duty cycle loss of the SR and therefore extra conduction loss.

Some method senses primary side current of transformer ($i_p$), which is usually smaller than the $i_{SR}$, because of relatively smaller primary current of the transformer through the CT. In this condition, separate magnetic inductor $L_m$ must be used, to get rid of the impact of magnetic current $i_{Lm}$, which will induce extra cost and size for inductor $L_m$.

Certain aspects of the present disclosure and their embodiments may provide further solutions to these or other challenges.

Figure 4A:
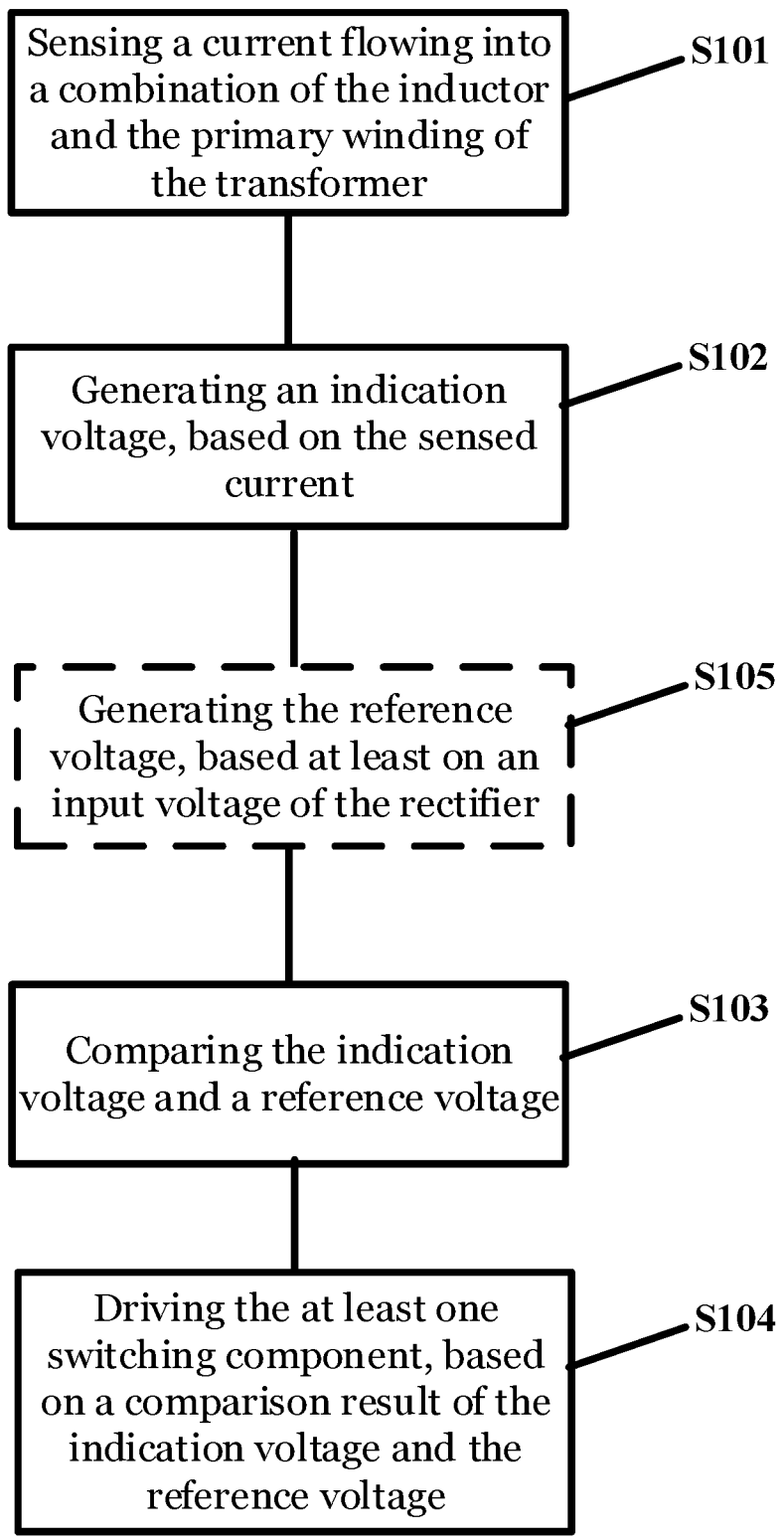
FIG. 4A is a flow chart showing a method for controlling a rectifier according to embodiments of the present disclosure.

FIG. 4A is a flow chart showing a method for controlling a rectifier according to embodiments of the present disclosure.

The rectifier, such as the rectifier shown in FIG. 1, may comprise a transformer T; an inductor $L_m$ coupled with a primary winding of the transformer in parallel; at least one switching component coupled between a secondary winding of the transformer and an output of the rectifier.

The method comprises: S101, sensing a current flowing into a combination of the inductor and the primary winding of the transformer; S102, generating an indication voltage, based on the sensed current; S103, comparing the indication voltage and a reference voltage; and S104, driving the at least one switching component, based on a comparison result of the indication voltage and the reference voltage.

According to embodiments of the present disclosure, a current $i_r$ flowing into a combination of the inductor and the primary winding of the transformer of the rectifier is selected for controlling the at least one switching component of the rectifier. The timing point for turning on/off the switching component may be optimized, such that the current flowing through switching component may have a reduced value (a minimum value, such as basically zero), when the switching component is to be turned off. Therefore, the power loss may be reduced and the efficiency may be improved.

In exemplary embodiments of the present disclosure, the method further comprises: S105, generating the reference voltage, based at least on an input voltage of the rectifier.

Therefore, an adaptive reference voltage based on input voltage may be generated. For example, the reference voltage may be proportional to $V_{in}$. Therefore, the method for controlling the rectifier according to embodiments of the present disclosure may be applied to a wide range input voltage.

FIG. 4B is a flow chart showing an additional step of method for controlling a rectifier according to embodiments of the present disclosure.

In exemplary embodiments of the present disclosure, the input voltage is a direct current (DC) voltage; and the input voltage is converted, by a primary side bridge circuit, to an alternative current (AC) voltage. The method further comprises: S1041, driving the at least one switching component, based on a driving signal of the primary side bridge circuit, and the comparison result of the indication voltage and the reference voltage.

That is, the method for controlling the rectifier according to embodiments of the present disclosure may be particularly applicable to synchronous rectification.

FIG. 4C is a flow chart showing other additional steps of the method for controlling a rectifier according to embodiments of the present disclosure.

In exemplary embodiments of the present disclosure, the at least one switching component of the rectifier comprises a first switching component $SR_1$ and a second component $SR_2$; the primary side bridge circuit comprises a third switching component $Q_1$, and a fourth switching component $Q_2$. The method further comprises: S10411, driving the first switching component, based on a driving signal of the third switching component, and the comparison result of the indication voltage and the reference voltage; and S10412, driving the second switching component, based on a driving signal of the fourth switching component, and the comparison result of the indication voltage and the reference voltage.

In exemplary embodiments of the present disclosure, the primary side bridge circuit may be a half bridge including a branch with two switching components, or the primary side bridge circuit may be a full bridge including two branches each with two switching components. For example, as shown in the FIG. 1, a full bridge is illustrated, and thus the primary side bridge circuit further comprises a fifth switching component $Q_3$; and a sixth switching component $Q_4$.

In exemplary embodiments of the present disclosure, the first switching component is turned on, if the generated indication voltage is greater than the reference voltage and the third switching component is turned on; the first switching component is turned off, if the generated indication voltage is less than the reference voltage or the third switching component is turned off; the second switching component is turned on, if the generated indication voltage is greater than the reference voltage and the fourth switching component is turned on; and the second switching component is turned off, if the generated indication voltage is less than the reference voltage or the fourth switching component is turned off.

According to embodiments of the present disclosure, the method for controlling the rectifier is applicable to a converter including the primary side bridge circuit (either half bridge or full bridge) and the synchronous rectifier.

In exemplary embodiments of the present disclosure, the sensed current is a resonant current $i_r$ of a resonant circuit; and the resonant circuit is coupled between the primary side bridge circuit and the inductor.

In exemplary embodiments of the present disclosure, the reference voltage is generated, based at least on an input voltage of the rectifier, an induction value of the inductor, and a resonant frequency of the resonant circuit.

In exemplary embodiments of the present disclosure, the sensed current is bidirectional alternative current; and the generated indication voltage is a unidirectional alternative voltage.

In exemplary embodiments of the present disclosure, the reference voltage has a first value; the indication voltage becomes to a second value, corresponding to that a current flowing in the secondary winding of the transformer becomes to a minimum value; and the first value of the reference voltage is equal to the second value of the indication voltage, or greater than the second value with an offset.

The minimum value may appear when the current flowing through secondary winding of the transformer becomes to zero, and $i_r=i_{Lm}$.

In exemplary embodiments of the present disclosure, the reference voltage becomes from the first value to a third value, corresponding to that the first switching component or the second switching component is turned off.

In exemplary embodiments of the present disclosure, the reference voltage has a first value; the indication voltage becomes to a second value, corresponding to that a current flowing in the inductor integrated with the primary winding of the transformer becomes to a peak value; and wherein a first value of the reference voltage is equal to the second value of the indication voltage or greater than the second value with an offset. For example, the peak value may be obtained at the end of half resonant duty.

According to embodiments of the present disclosure, the method for controlling the rectifier is applicable to all three control modes of the resonant converter: switching frequency ($f_s$) is equal to resonant frequency ($f_r$), $f_s$ is bigger than $f_r$, $f_s$ is smaller than $f_r$.

Figure 5:
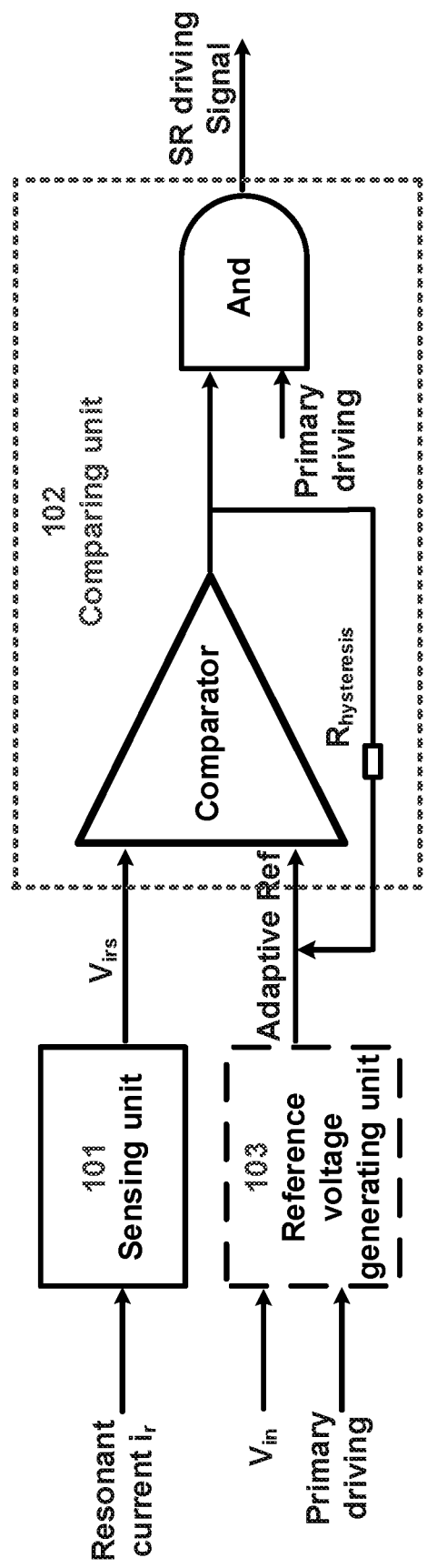
FIG. 5 shows a block diagram for a circuit for controlling a rectifier, such as this rectifier shown in FIG. 1, according to embodiments of the present disclosure.

FIG. 5 shows a block diagram for a circuit for controlling a rectifier, such as this rectifier shown in FIG. 1, according to embodiments of the present disclosure.

The circuit for controlling the rectifier comprises: a sensing unit 101, configured to sense a current flowing into a combination of the inductor and the primary winding of the transformer; and generate an indication voltage, based on the sensed current; a comparing unit 102, configured to compare the indication voltage and a reference voltage. The circuit for controlling a rectifier is configured to drive the at least one switching component, based on a comparison result of the indication voltage and the reference voltage.

For example, the current flowing into a combination of the inductor and the primary winding of the transformer may be the resonant current $i_r$.

In exemplary embodiments of the present disclosure, the circuit for controlling the rectifier further comprises: a reference voltage generating unit 103, configured to generate the reference voltage Ref, based on at least on an input voltage $V_{in}$ of the rectifier.

The driving signal of the primary side bridge circuit may be further used for synchronization. For example, the reference voltage generating unit 103 may be further configured to control a comparison between the indication voltage $V_{irs}$ and the reference voltage Ref, based on the driving signal of the primary side bridge circuit (primary driving).

The comparing unit 102 may be further configured to output the SR driving signals based on the comparison result of the indication voltage and the reference voltage, and the driving signal of the primary side bridge circuit.

A hysteresis resistor Rhysteresis may be coupled between the output terminal and one input terminal for reference voltage. The Rhysteresis may boost the voltage value at the input terminal of the comparator for reference voltage, when a comparing result is positive (Ref>Virs), such that the reference voltage may become form a first value to a third value.

It should be understood that, for any of the SR1, SR2, one unique combination of the sensing unit 101, the comparing unit 102, the reference voltage generating unit 103 may be arranged.

Alternatively, some or all of such units may be shared between SR1, SR2. For example, in one period of a control cycle, the SR driving signal may be selectively outputted to one of the SR1, SR2, and in another period, the SR driving signal may be outputted to the other of the SR1, SR2.

Correspondingly, the specific primary driving signal used for controlling the switching components may also be different in the different periods of the control cycle.

Figure 6:
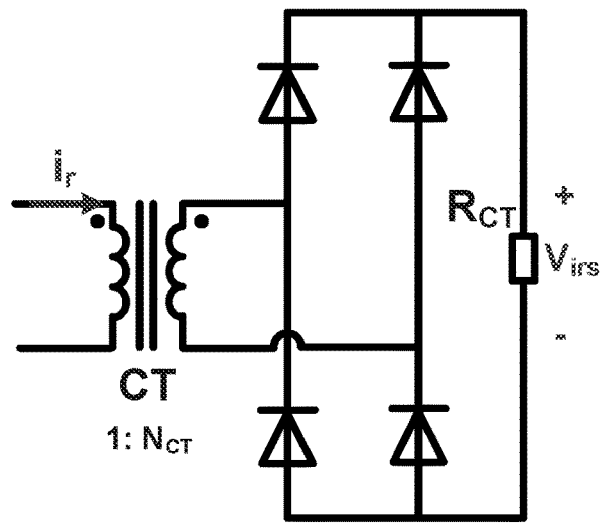
FIG. 6 is an exemplary circuit diagram for the sensing unit, according to embodiments of the present disclosure.

FIG. 6 is an exemplary circuit diagram for the sensing unit, according to embodiments of the present disclosure.

In exemplary embodiments of the present disclosure, the sensing unit comprises: a current transformer CT, and a diode rectifier with four diodes. The indication voltage $V_{irs}$ will be outputted across the resistor $R_{CT}$. "1: NCT" refers to turns ratio of the current-sense transformer.

Figure 7A:
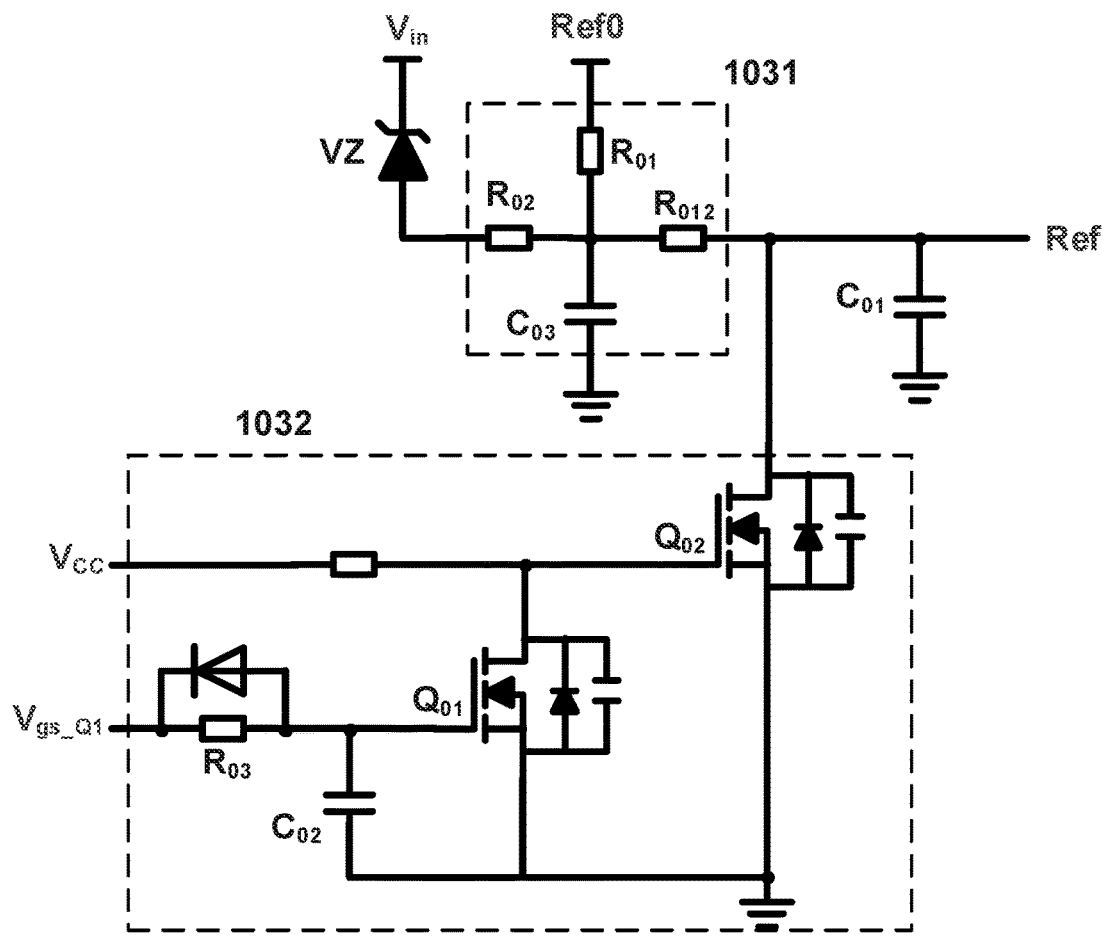
FIG. 7A is an exemplary circuit diagram for the reference voltage generating unit, according to embodiments of the present disclosure.

FIG. 7A is an exemplary circuit diagram for the reference voltage generating unit, according to embodiments of the present disclosure.

In exemplary embodiments of the present disclosure, the reference voltage generating unit 103 comprises: a resistance network 1031, configured to convert the input voltage to the reference voltage; and a first delay capacitor C01, coupled between an output port of the reference voltage generating unit and a ground, and configured to delay an output of the reference voltage.

The resistance network 1031 may comprise resistors R01, R02, R012. The Ref0 is a fixed reference voltage for assisting generating the reference voltage Ref. VZ is a Zener diode.

It should be understood that the connection relationship of the resistors R01, R02, R012 may be determined due to any practical requirement. In the FIG. 7A, the reference value may be calculated as:

$$Ref = Ref0 + (V_{in} - Vz - Ref0) * \frac{R_{01}}{R_{01} + R_{02}} =$$

$$V_{in} * \frac{R_{01}}{R_{01} + R_{02}} + \frac{R_{02} * Ref0 - Vz * R_{01}}{R_{01} + R_{02}}$$

Further, in exemplary embodiments of the present disclosure, the reference voltage generating unit further comprises: an output control subunit 1032, configured to control a comparison between the indication voltage and the reference voltage, based on the driving signal of the primary side bridge circuit. The output control subunit 1032 comprises: a second delay capacitor C02, coupled between an input port of the output control subunit and a ground, and configured to delay an input of the driving signal of the primary side bridge circuit.

In exemplary embodiments of the present disclosure, the output control subunit is coupled to an output port of the reference voltage generating unit, and is configured to ground the output port of the reference voltage generating unit if the driving signal of the primary side bridge circuit is inactive.

$V_{cc}$ may be a fixed auxiliary voltage which can turn the transistor $Q_{02}$ on. $V_{gs\_Q1}$ is a driving signal of the transistor $Q_1$. Therefore, when the $V_{gs\_Q1}$ is inactive ($Q_1$ is turned off), the transistor $Q_{01}$ is also turned off, such that the $V_{cc}$ turns the transistor $Q_{02}$ on, and the output terminal for Ref is grounded. Only when the $V_{gs\_Q1}$ is active, the reference voltage Ref can be outputted.

The resistor $R_{03}$, and the capacitor $C_{02}$ may provide a delay and filtering function.

Figure 7B:
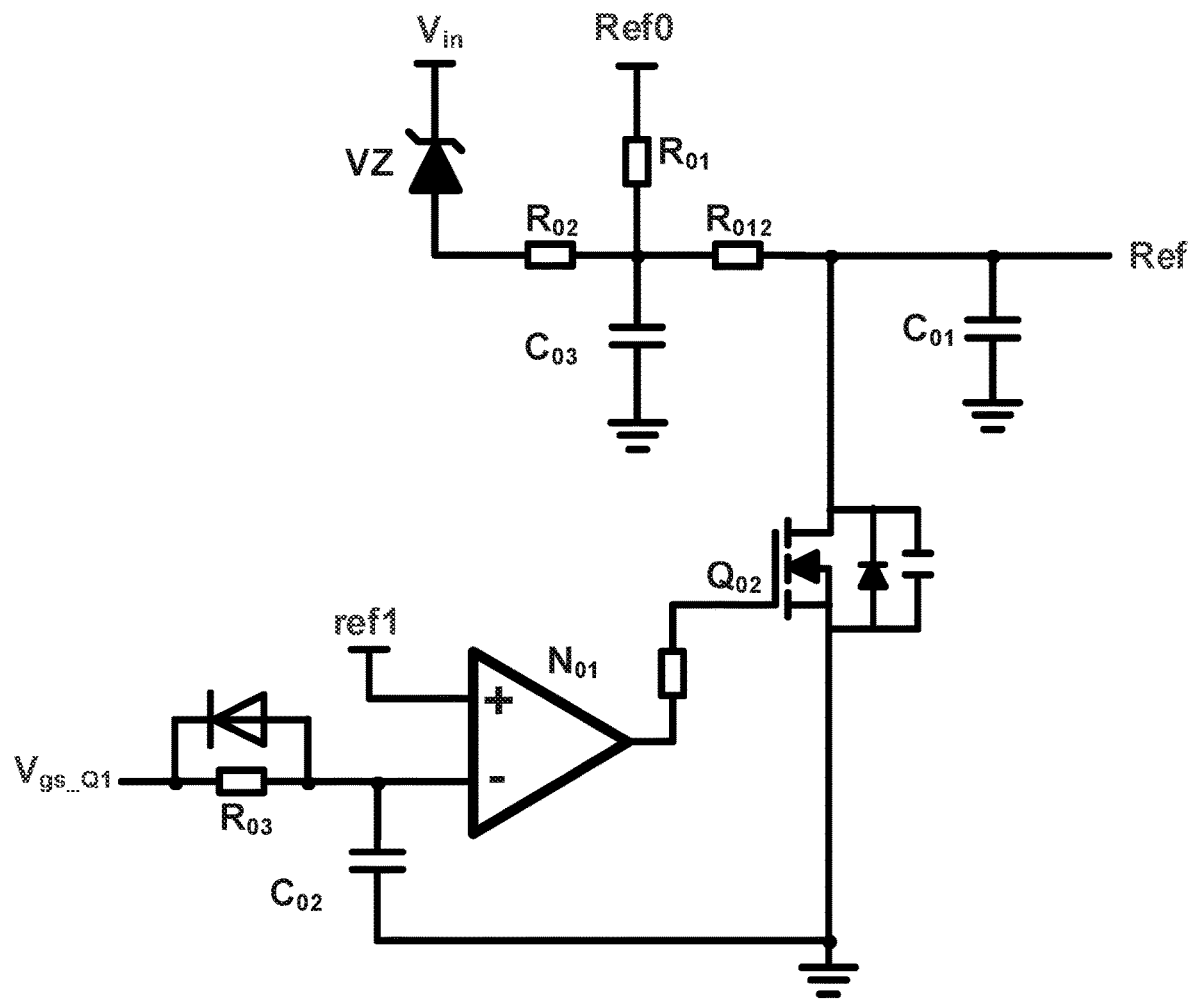
FIG. 7B is another exemplary circuit diagram for the reference voltage generating unit, according to embodiments of the present disclosure.

FIG. 7B is another exemplary circuit diagram for the reference voltage generating unit, according to embodiments of the present disclosure.

The difference between FIG. 7B and FIG. 7A is that, the transistor $Q_{01}$ is replaced by a comparator $N_{01}$. Only when the $V_{gs\_Q1}$ is bigger than another fixed reference ref1, the $Q_{02}$ is turned off, and the reference voltage can be outputted.

Figure 8:
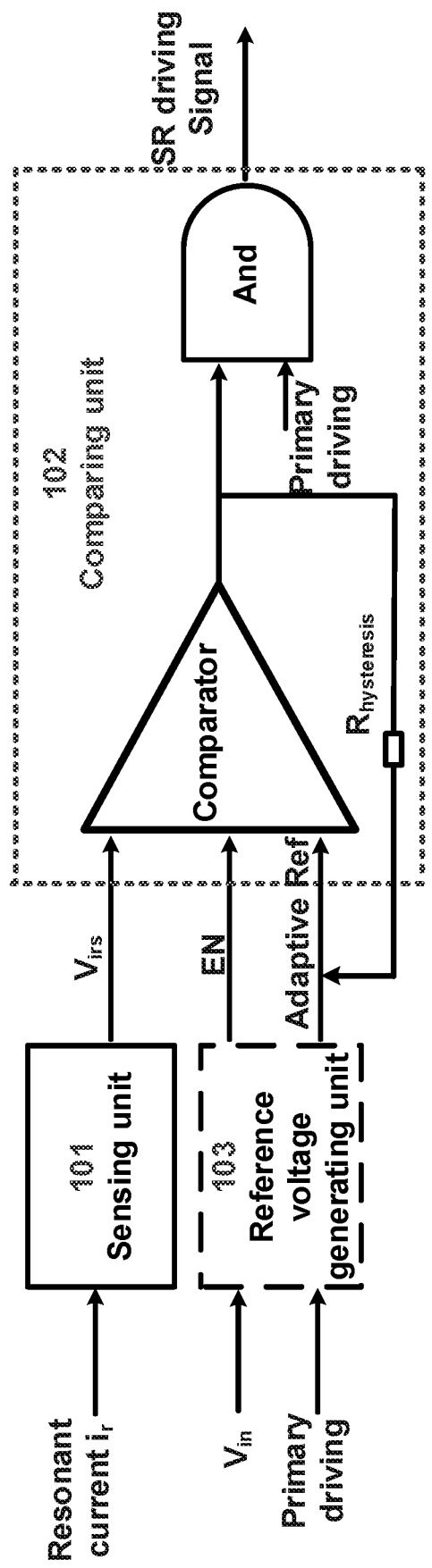
FIG. 8 shows another block diagram for a circuit for controlling a rectifier, according to embodiments of the present disclosure.

FIG. 8 shows another block diagram for a circuit for controlling a rectifier, according to embodiments of the present disclosure.

The difference between the FIG. 8 and the FIG. 5 is that, the reference voltage generating unit 103 may be further configured to control a comparison between the indication voltage and the reference voltage by enabling/disenabling a comparator in the comparing unit 102, based on the driving signal of the primary side bridge circuit (primary driving).

Figure 9A:
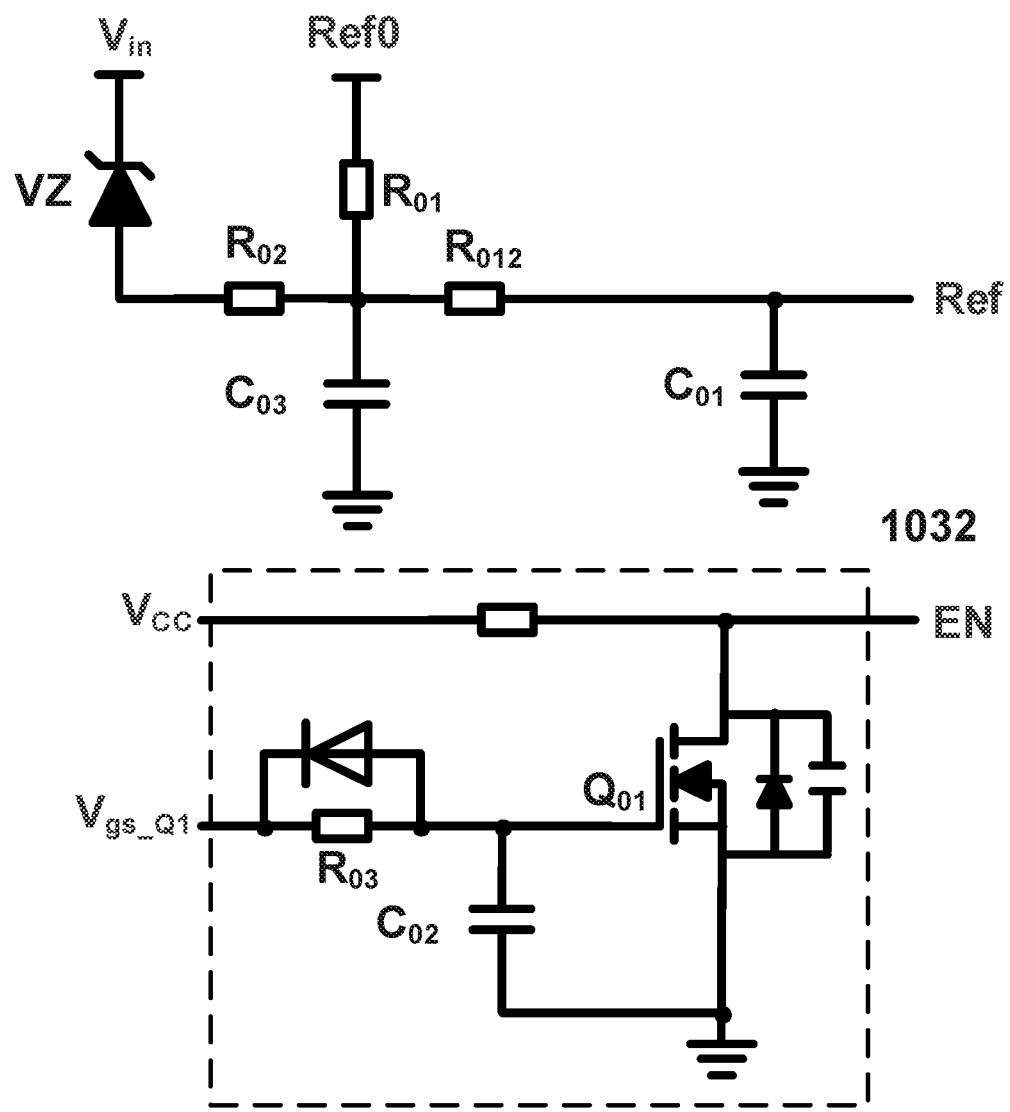
FIG. 9A is an exemplary circuit diagram for the reference voltage generating unit, according to embodiments of the present disclosure.

FIG. 9A is an exemplary circuit diagram for the reference voltage generating unit, according to embodiments of the present disclosure.

In exemplary embodiments of the present disclosure, the output control subunit 1032 is coupled to an enable port EN of the comparing unit, and is configured to disable the comparing unit if the driving signal of the primary side bridge circuit is inactive. Compared to FIG. 7A, the transistor $Q_{02}$ is removed.

Figure 9B:
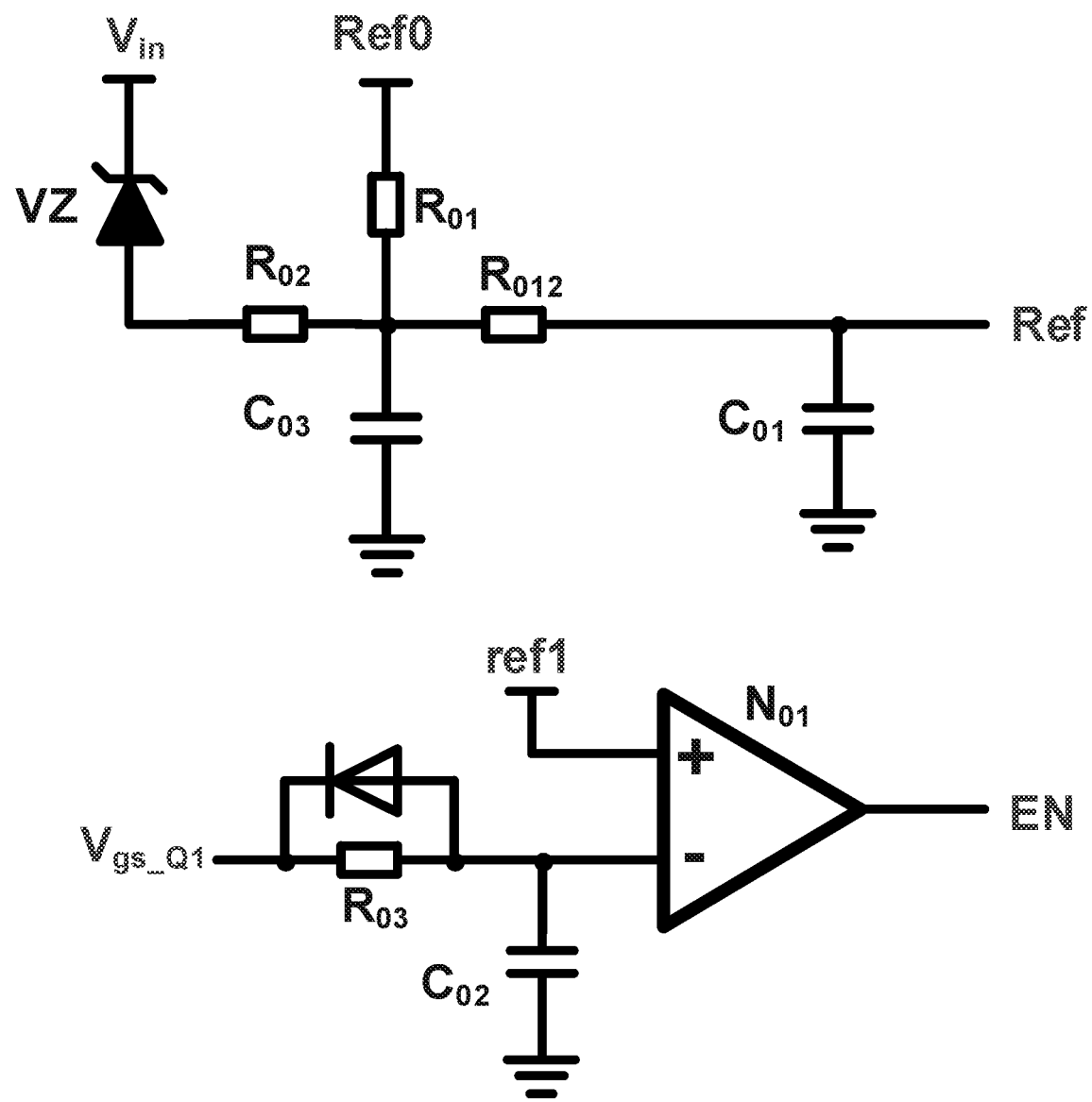
FIG. 9B is another exemplary circuit diagram for the reference voltage generating unit, according to embodiments of the present disclosure.

FIG. 9B is another exemplary circuit diagram for the reference voltage generating unit, according to embodiments of the present disclosure.

The difference between FIG. 9B and FIG. 9A is that, the transistor $Q_{01}$ is replaced by a comparator $N_{01}$.

That is, in some embodiments of the present disclosure, the circuit for controlling the rectifier may include 3 main parts: the sensing unit 101, which senses the resonant current ir and produces a positive voltage signal Virs tracking/indicating the resonant current; a reference voltage generating unit 103 (an auxiliary circuit), with a key function to generate an adaptive reference (Ref) based on primary driving signal and input voltage; and a comparing unit 102, making SR driving signal's on edge same as primary driving's on edge, then comparing $V_{irs}$ and Ref to generate SR driving signal's off edge.

About the sensing unit 101, it should be understood that there are different implementation methods, and FIG. 6 only shows one exemplary kind of them, without limitation.

About the reference voltage generating unit 103, the key point is generating adaptive reference Ref. When primary driving signal is high, after a period of delay (determined by $R_{03}$, $C_{03}$ and $Q_{01}$'s $V_{gs}$ threshold), the reference begins to ramp up to a value Ref (a first value) which is proportional to $V_{in}$.

In exemplary embodiments of the present disclosure, the sensed current is a resonant current $i_r$ of a resonant circuit ($L_r$, $C_r$).

In exemplary embodiments of the present disclosure, the reference voltage is generated, based at least on an input voltage of the rectifier, an induction value of the inductor, and a resonant frequency of the resonant circuit.

The calculation of the value Ref may be shown as below, in one exemplary implementation.

A peak value of magnetic inductor current $I_{m\_pk}$ is shown as following:

$$I_{m\_pk} = \frac{V_{in}}{4 L_m f r}$$

The sensing signal of $I_{m\_pk}$ is shown as follows:

$$V_{mpk\_s} = \frac{V_{in}}{4 L_m f r} \cdot \frac{R_{CT}}{N_{CT}}$$

The adaptive reference Ref is shown as following:

$$Ref = Ref0 + (V_{in} - Vz - Ref0) * \frac{R_{01}}{R_{01} + R_{02}} =$$

$$V_{in} * \frac{R_{01}}{R_{01} + R_{02}} + \frac{R_{02} * Ref0 - Vz * R_{01}}{R_{01} + R_{02}}$$

In order to get an adaptive reference following $V_{mpk\_s}$, $R_{01}$, $R_{02}$, $Ref_0$ and Vz are selected according to the following formulas:

$$Vz = Vin\_min;$$

$$\frac{R_{01}}{R_{01} + R_{02}} = \frac{R_{CT}}{4 L_m f_r N_{CT}};$$

$$\frac{R_{02} * Ref0 - Vz * R_{01}}{R_{01} + R_{02}} = 0.$$

The following is the exemplary key parameters (only one kind of design):

Lm: 6 uH, fr: 200 kHz, $R_{CT}$: 7Ω, $N_{CT}$: 70. Vz: 36V Zener, Ref0: 0.8V, R01: 590Ω, R02: 27 kΩ, R012: 820Ω, C01: 0.1 uF, C02: 47 pF, R03: 22 kΩ, C03: 220 pF.

By using the above parameters, $$\frac{R_{01}}{R_{01} + R_{02}} = \frac{R_{CT}}{4 L_m f_r N_{CT}} = 0.021$$

$$\frac{R_{02} * Ref0 - Vz * R_{01}}{R_{01} + R_{02}} = 0.013.$$

Figure 10:
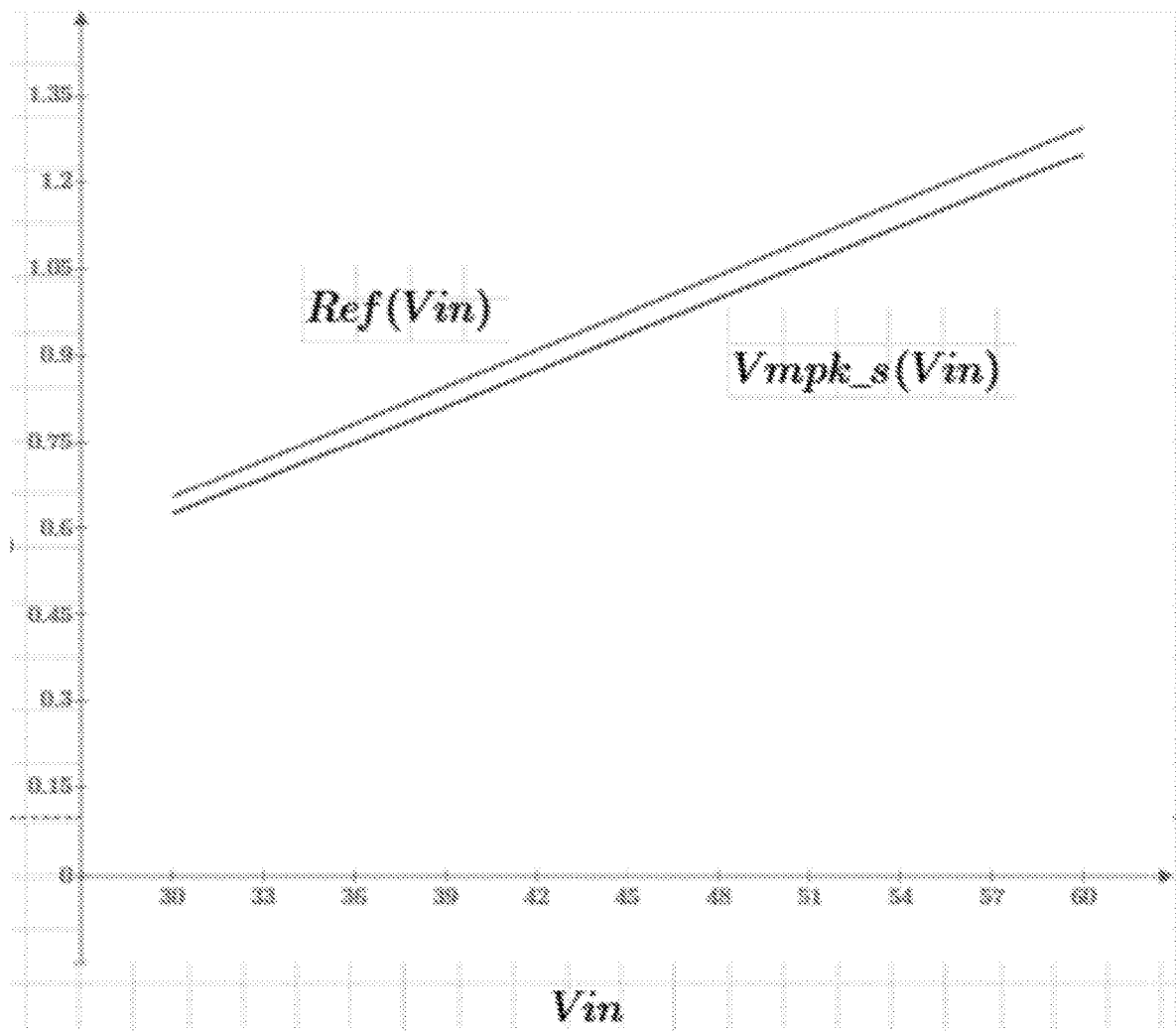
FIG. 10 shows the curves of the Vmpk_s(Vin) and Ref (Vin).

FIG. 10 shows the curves of the Vmpk_s($V_{in}$) and Ref ($V_{in}$). "($V_{in}$)" means that Vmpk_s and Ref varies as function of $V_{in}$.

As shown in FIG. 10, the curves of formulas Vmpk_s (Vin) and Ref(Vin) has the same slope, and keep 0.13V difference value (not the ideal zero value) to let the driving signals turn off the transistors safer.

Figure 12:
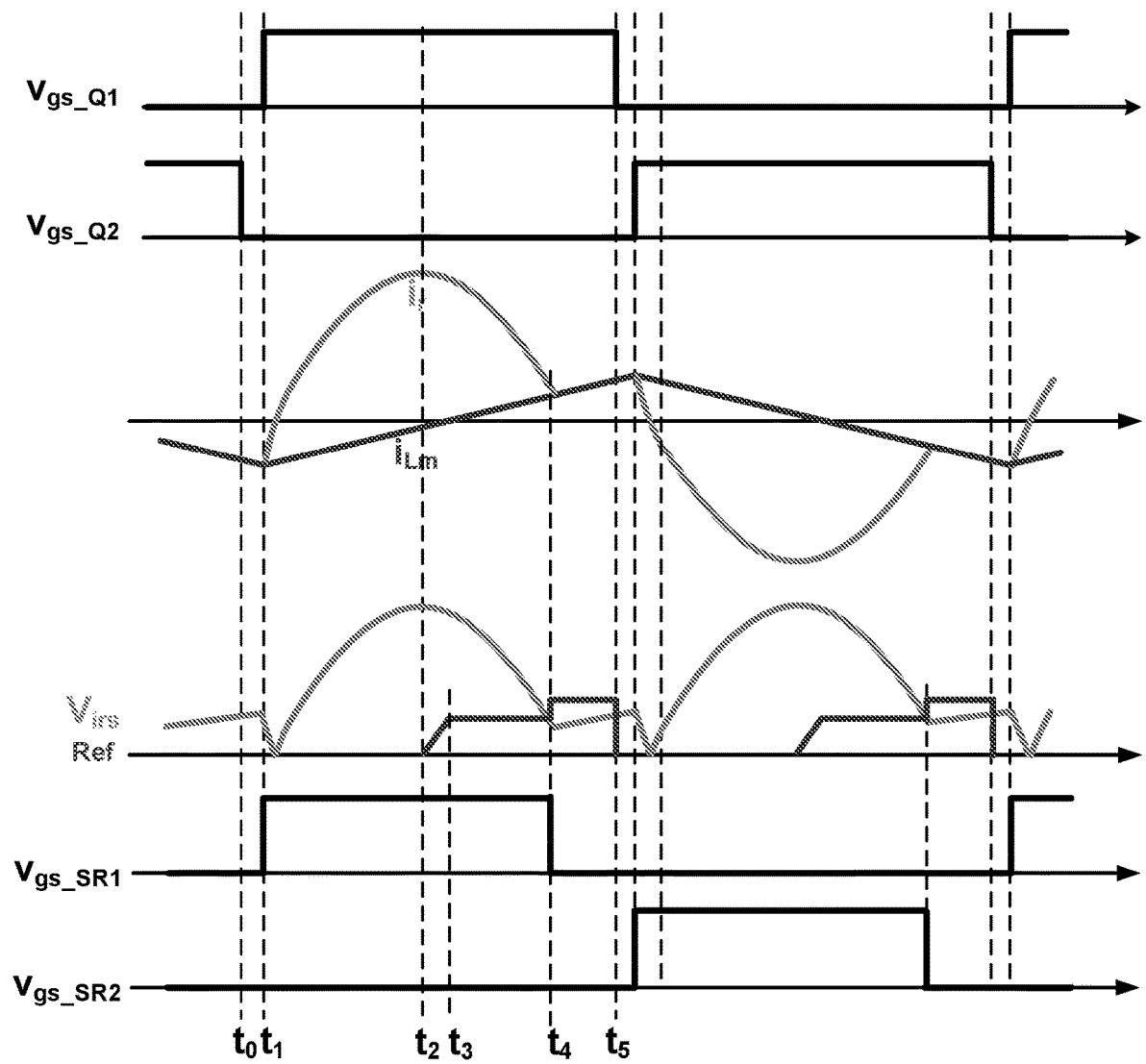
FIG. 12 is a time sequence diagram showing working principle and signal waves when fs is smaller than fr.

In addition, $C_{03}$ is a filter, $R_{03}$ and $C_{02}$ determine the time of t2, $R_{012}$ and $C_{01}$ determine the time of t2~t3 (as FIG. 12 shows).

The circuit for controlling the rectifier may be applied to the converter as shown in FIG. 1, the input voltage $V_{in}$ is a direct current (DC) input voltage; the input voltage is converted, by a primary side bridge circuit, to an alternative current (AC) voltage; and the circuit for controlling the rectifier is configured to drive the at least one switching component, based on a driving signal of the primary side bridge circuit (Q1, Q2, Q3, Q4), and the comparison result of the indication voltage and the reference voltage.

In exemplary embodiments of the present disclosure, the at least one switching component of the rectifier comprises a first switching component SR1 and a second component SR2; the primary side bridge circuit comprise a first branch including a third switching component Q1, and a second branch including a fourth switching component Q2. The circuit for controlling the rectifier is further configured to: drive the first switching component SR1, based on a driving signal of the third switching component, and the comparison result of the indication voltage and the reference voltage; and drive the second switching component SR2, based on a driving signal of the fourth switching component and the comparison result of the indication voltage and the reference voltage.

In exemplary embodiments of the present disclosure, the first branch of the primary side bridge circuit further comprises a fifth switching component Q3; and the second branch of the primary side bridge circuit further comprises a sixth switching component Q4.

In exemplary embodiments of the present disclosure, the first switching component SR1 is turned on, if the generated indication voltage is greater than the reference voltage and the third switching component is turned on; the first switching component SR1 is turned off, if the generated indication voltage is less than the reference voltage or the third switching component is turned off, the second switching component SR2 is turned on, if the generated indication voltage is greater than the reference voltage and the fourth switching component is turned on; and the second switching component SR2 is turned off, if the generated indication voltage is less than the reference voltage or the fourth switching component is turned off.

Figure 11:
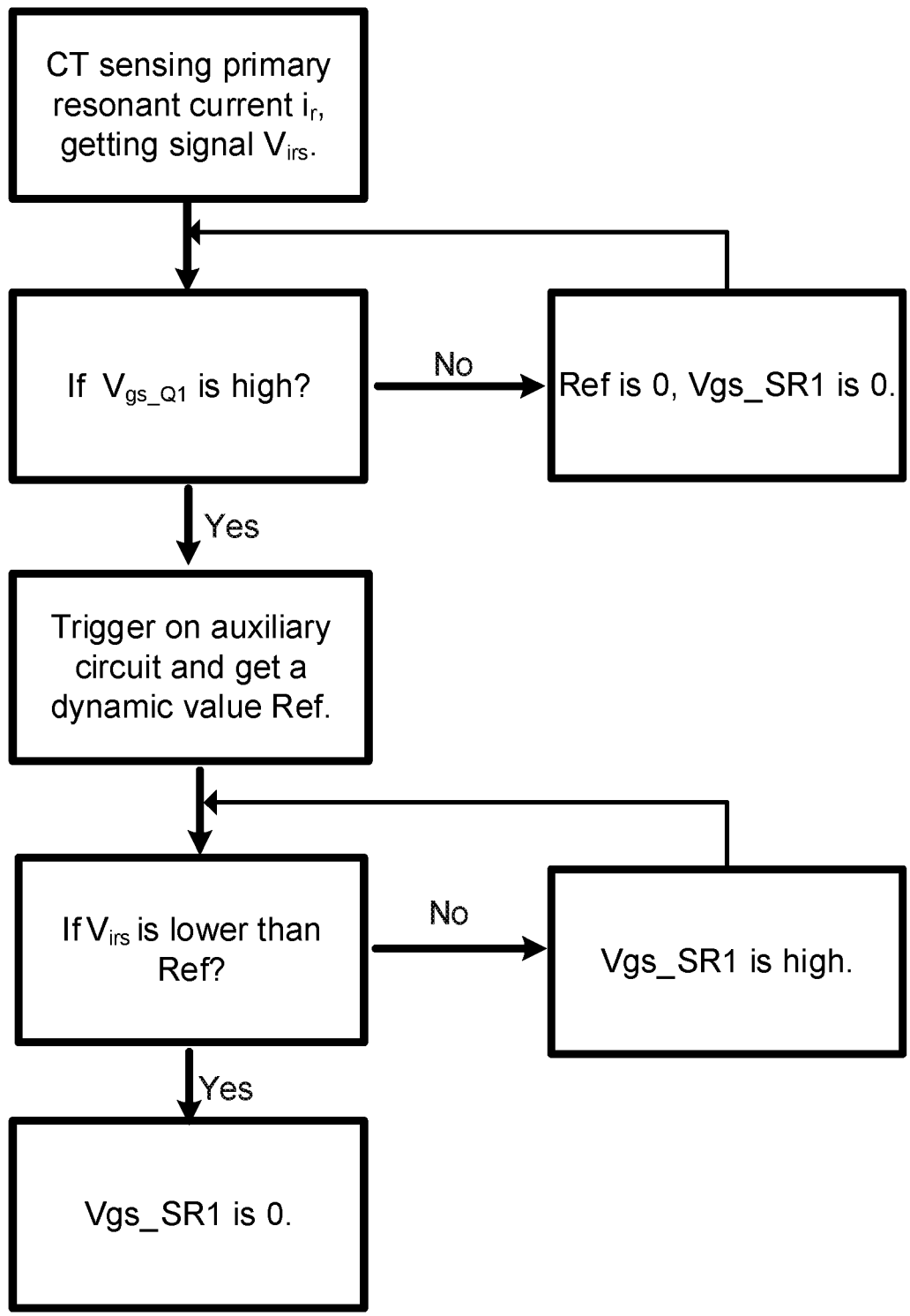
FIG. 11 shows the specific flowchart of controlling the specific driving signals of the switching components.

FIG. 11 shows the specific flowchart of controlling the specific driving signals of the switching components.

Firstly, the current-sense transformer CT senses the resonant current, and gets a voltage signal $V_{irs}$.

Secondly, it is judged whether $V_{gs\_Q1}$ is high. If no, Ref and $V_{gs\_SR1}$ are kept low. If yes, the auxiliary circuit (reference voltage generating unit 103) is turned on and produces an adaptive reference Ref.

The adaptive reference not only means that the Ref may vary as function of the $V_{in}$, but also means that the value of the reference may change during a control cycle, corresponding to switching operation.

Then, $V_{irs}$ is compared to Ref. If $V_{irs}$>Ref, $V_{gs\_SR1}$ becomes high and $SR_1$ FET is turned on. If $V_{irs}$=Ref, $V_{gs\_SR1}$ becomes low and $SR_1$ FET is turned off.

The specific value of the sensed current and/or the reference voltage may vary according to specific operation modes, without limitation.

In exemplary embodiments of the present disclosure, the reference voltage has a first value; the indication voltage becomes to a second value, corresponding to that a current flowing in the secondary winding of the transformer becomes to a minimum value; and the first value of the reference voltage is equal to the second value of the indication voltage, or greater than the second value with an offset.

In exemplary embodiments of the present disclosure, the reference voltage becomes from the first value to a third value, corresponding to that the first switching component or the second switching component is turned off.

In exemplary embodiments of the present disclosure, the reference voltage has a first value; the indication voltage becomes to a second value, corresponding to that a current flowing in the inductor becomes to a peak value; and a first value of the reference voltage is equal to the second value of the indication voltage or greater than the second value with an offset.

FIG. 12 is a time sequence diagram showing working principle and signal waves when fs is smaller than fr.

The time sequence diagram may have following time periods.

Period t0~t1 is dead time.

At t1: Q1 turns on, then SR1 FET turns on, and auxiliary circuit (reference voltage generating unit) is triggered on.

At t2: The adaptive reference begins to ramp up and reaches a first value (the value is equal to $V_{mpk\_s}$ or bigger than the $V_{mpk\_s}$ with an offset) at t3.

At t4: Current sensing signal $V_{irs}$ reduces to a second value (when the current flowing in the secondary winding of the transformer becomes to a minimum value, or a current flowing in the inductor $L_m$ becomes to a peak value) and thus touches Ref, $SR_1$ FET turns off. For example, the peak value may be obtained at the end of half resonant duty, such as the t4. The non-resonant period (such as t4~t5) may be avoided.

In period t4~t5: Ref will increase to a new third value due to the comparator hysteresis design to avoid SR1 FET being turn on again by a fluctuation of the $V_{irs}$.

At t5: Q1 turns off, auxiliary circuit (reference voltage generating unit) is triggered off and Ref is pulled to zero.

Figure 13:
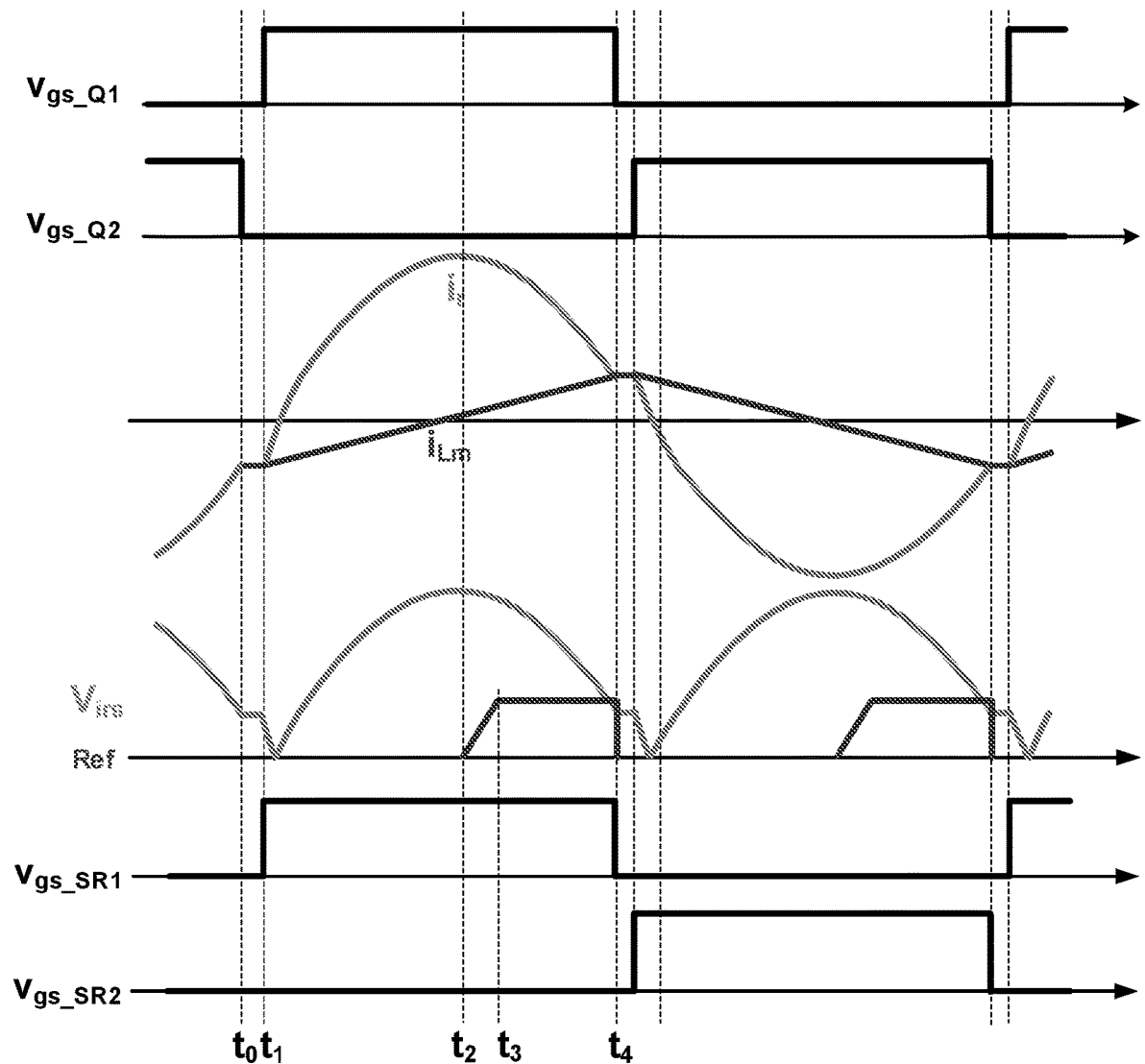
FIG. 13 is a time sequence diagram showing working principle and signal waves when fs is equal to fr.
Figure 14:
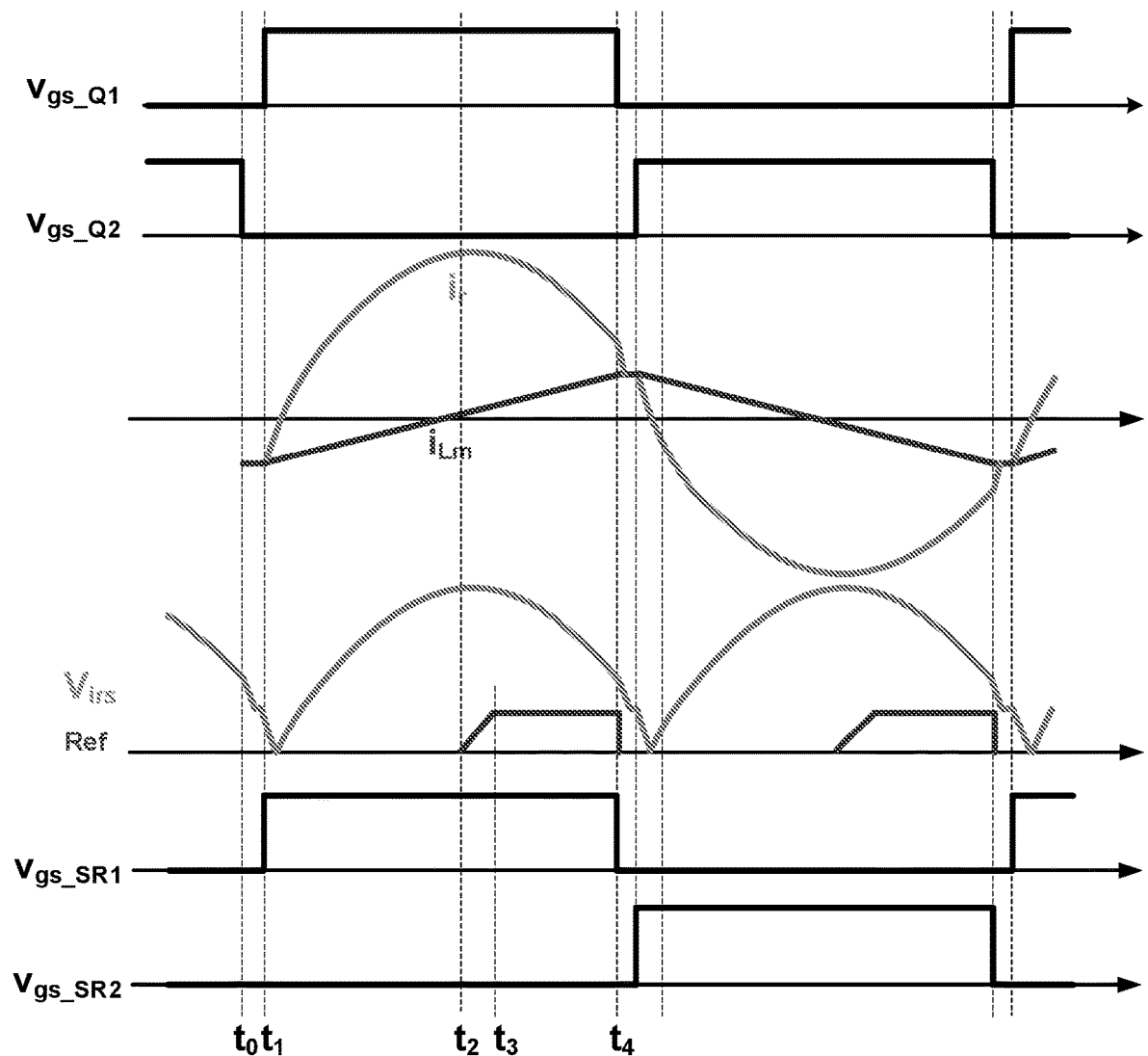
FIG. 14 is a time sequence diagram showing working principle and signal waves when fs is bigger than fr.

FIG. 13 is a time sequence diagram showing working principle and signal waves when fs is equal to fr. FIG. 14 is a time sequence diagram showing working principle and signal waves when fs is bigger than fr.

Compared to FIG. 12, only the time points in FIG. 13, 14 for switching off the switching unit are delayed, due to the changed operation mode. That is, the method and circuit for controlling the rectifier according to embodiments of the present disclosure are applicable to all these three operation modes.

In exemplary embodiments of the present disclosure, the circuit for controlling the rectifier circuit may be applied to any circuit including the rectifier, such as a resonant converter.

According to embodiments of the present disclosure, a current flowing into a combination of the inductor and the primary winding of the transformer of the rectifier is selected for controlling the at least one switching component of the rectifier. The timing point for turning on/off the switching component may be optimized, so as to reduce the current flowing through switching component when the switching component is to be turned off. Therefore, the power loss may be reduced and the efficiency may be improved.

Specifically, this new control strategy may get synchronous rectification driving signals of resonant converter by sensing resonant current signals and primary driving signals.

To resolve the problems in existing SR driving solution, the new driving method for the SR by sensing the resonant current $i_r$ is provided. To eliminate the impact of the magnetic current $i_{Lm}$, an adaptive reference which is proportional to the input voltage $V_{in}$ is used. The primary side driving signals is further utilized for synchronization in this control circuit, which further reduces the body diode conduction time.

Some exemplary advantages of such solution may include: the optimization of SR FET turning on/off time, which makes ON time of SR FET body diode to be shortest, and therefore higher power efficiency; the smaller size CT to sense resonant current compared to sense the current of SR FET ($i_{SR}$); and the magnetic inductor $L_m$ being integrated into transformer T by adding simple and cheap auxiliary circuit (reference voltage generating unit) to eliminate the impact of $i_{Lm}$.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-limiting and exemplary embodiments of this disclosure.

| Abbreviation | Explanation |
| --- | --- |
| $R_{ds(on)}$: | Conduction resistor of MOSFET between drain and source. |
| $i_{SR}$: | Current of SR FET. |
| $L_{stray}$: | Stray inductor of SR FET. |
| $V_{stray}$: | Voltage drop on Stray inductor of SR FET. |
| $V_{ds}$: | Voltage drop between drain and source of MOSFET. |
| $f_s$: | Switching frequency. |
| $f_r$: | Resonant frequency, determined by Lr, Cr. |
| $L_m$: | Magnetic inductor, integrated in transformer, or independent. |
| $i_{Lm}$: | Current of magnetic inductor. |
| CT: | Current-sense transformer. |
| $V_{irs}$: | The voltage signal tracking primary side current. |
| Ref0: | A fixed reference voltage |
| $V_{cc}$: | A fixed auxiliary voltage. |
| Ref: | The adaptive reference to control the off edge of SR FET. |
| $V_{in}$: | Input voltage of converter's power stage. |
| $R_{01}$, $R_{02}$, $R_{03}$, $R_{012}$, RCT, $R_{hysteresis}$: | Resistors. |
| $C_{01}$, $C_{02}$, $C_{03}$: | Capacitor. |
| $Q_{01}$, $Q_{02}$: | Signal MOSFET. |
| $N_{01}$: | Comparator. |

The invention claimed is:

1. A method for controlling a rectifier, wherein the rectifier comprises a transformer, an inductor coupled with a primary winding of the transformer in parallel, and at least one switching component coupled between a secondary winding of the transformer and an output of the rectifier, wherein the at least one switching component of the rectifier comprises a first switching component and a second component, the method comprising:
sensing a current flowing into a combination of the inductor and the primary winding of the transformer;
generating an indication voltage, based on the sensed current;
generating a reference voltage, based at least on an input voltage of the rectifier, wherein the input voltage is a direct current (DC) voltage and is converted, by a primary side bridge circuit, to an alternative current (AC) voltage, wherein the primary side bridge circuit comprises a third switching component and a fourth switching component;

comparing the indication voltage and a reference voltage; and driving the at least one switching component, based on a driving signal of the primary side bridge circuit and based on a result of comparing the indication voltage and the reference voltage, wherein said driving comprises:
- driving the first switching component, based on a driving signal of the third switching component and based on the result of comparing the indication voltage and the reference voltage; and
- driving the second switching component, based on a driving signal of the fourth switching component and based on the result of comparing the indication voltage and the reference voltage;

wherein the first switching component is turned on, if the generated indication voltage is greater than the reference voltage and the third switching component is turned on;

wherein the first switching component is turned off, if the generated indication voltage is less than the reference voltage or the third switching component is turned off;

wherein the second switching component is turned on, if the generated indication voltage is greater than the reference voltage and the fourth switching component is turned on; and wherein the second switching component is turned off, if the generated indication voltage is less than the reference voltage or the fourth switching component is turned off.

2. The method according to claim 1, wherein the primary side bridge circuit is:
- a half bridge including a branch with two switching components; or
- a full bridge including two branches each with two switching components.

3. The method according to claim 1, wherein the sensed current is a resonant current of a resonant circuit, wherein the resonant circuit is coupled between the primary side bridge circuit and the inductor, wherein the inductor is integrated in the transformer, and wherein the reference voltage is generated based at least on an input voltage of the rectifier, an induction value of the inductor, and a resonant frequency of the resonant circuit.

4. The method according to claim 1, wherein the reference voltage has a first value, wherein the indication voltage becomes to a second value, corresponding to that a current flowing in the inductor becomes to a peak value, and wherein a first value of the reference voltage is equal to the second value of the indication voltage or greater than the second value with an offset.

5. A circuit for controlling a rectifier, wherein the rectifier comprises a transformer, an inductor coupled with a primary winding of the transformer in parallel, and at least one switching component coupled between a secondary winding of the transformer and an output of the rectifier, the circuit for controlling the rectifier comprising:
- a sensing circuitry configured to sense a current flowing into a combination of the inductor and the primary winding of the transformer, and to generate an indication voltage based on the sensed current;
- reference voltage generating circuitry configured to generate a reference voltage based on at least on an input voltage of the rectifier, wherein the input voltage is a direct current (DC) voltage and is converted, by a primary side bridge circuit, to an alternative current (AC) voltage, wherein the reference voltage generating circuitry comprises:
  - a resistance network configured to convert the input voltage to the reference voltage;
  - a first delay capacitor coupled between an output port of the reference voltage generating circuitry and a ground, and configured to delay an output of the reference voltage; and
  - output control subcircuitry configured to control a comparison between the indication voltage and the reference voltage based on a driving signal of the primary side bridge circuit, wherein the output control subcircuitry comprises a second delay capacitor coupled between an input port of the output control subcircuitry and a ground, and is configured to delay an input of the driving signal of the primary side bridge circuit; and
- comparing circuitry configured to perform the comparison of the indication voltage and the reference voltage;

wherein the circuit for controlling the rectifier is configured to drive the at least one switching component, based on a result of the comparison of the indication voltage and the reference voltage.

6. The circuit for controlling the rectifier according to claim 5,
wherein the output control subcircuitry is coupled to an output port of the reference voltage generating circuitry, and is configured to ground the output port of the reference voltage generating circuitry if the driving signal of the primary side bridge circuit is inactive; or
wherein the output control subcircuitry is coupled to an enable port of the comparing circuitry, and is configured to disable the comparing circuitry if the driving signal of the primary side bridge circuit is inactive.

7. The circuit for controlling the rectifier according to claim 5,
wherein the reference voltage has a first value;
wherein the indication voltage becomes to a second value, corresponding to that a current flowing in the inductor becomes to a peak value; and
wherein a first value of the reference voltage is equal to the second value of the indication voltage or greater than the second value with an offset.

8. The circuit for controlling the rectifier according to claim 5, wherein the circuit for controlling the rectifier is configured to drive the at least one switching component, based on the driving signal of the primary side bridge circuit, and the result of the comparison of the indication voltage and the reference voltage.

9. The circuit for controlling the rectifier according to claim 8, wherein the at least one switching component of the rectifier comprises a first switching component and a second component, wherein the primary side bridge circuit comprises a third switching component and a fourth switching component, wherein the circuit for controlling the rectifier is further configured to:
- drive the first switching component based on a driving signal of the third switching component and the result of the comparison of the indication voltage and the reference voltage; and
- drive the second switching component based on a driving signal of the fourth switching component and the result of the comparison of the indication voltage and the reference voltage;

wherein the primary side bridge circuit is a half bridge including a branch with two switching components or is a full bridge including two branches each with two switching components.

10. The circuit for controlling the rectifier according to claim 9,
wherein the first switching component is turned on, if the generated indication voltage is greater than the reference voltage and the third switching component is turned on;
wherein the first switching component is turned off, if the generated indication voltage is less than the reference voltage or the third switching component is turned off;
wherein the second switching component is turned on, if the generated indication voltage is greater than the reference voltage and the fourth switching component is turned on; and
wherein the second switching component is turned off, if the generated indication voltage is less than the reference voltage or the fourth switching component is turned off.

11. The circuit for controlling the rectifier according to claim 8,
wherein the sensed current is a resonant current of a resonant circuit;
wherein the resonant circuit is coupled between the primary side bridge circuit and the inductor; and
wherein the inductor is integrated in the transformer.

* * * * *